United States Patent
Huo

(10) Patent No.: US 7,477,605 B2
(45) Date of Patent: Jan. 13, 2009

(54) METHODS PROVIDING VARIABLE GRANULARITY FOR DATA FLOW CONTROL USING A LEAKY BUCKET

(75) Inventor: David Di Huo, Newton, NJ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 961 days.

(21) Appl. No.: 10/608,445

(22) Filed: Jun. 30, 2003

(65) Prior Publication Data

US 2005/0025057 A1    Feb. 3, 2005

(51) Int. Cl.
*H04J 1/16* (2006.01)
*H04J 3/14* (2006.01)

(52) U.S. Cl. .................................. 370/235.1

(58) Field of Classification Search .............. 370/229, 370/230.1, 231, 232, 234, 235, 235.1
See application file for complete search history.

(56) References Cited

U.S. PATENT DOCUMENTS

| | | | |
|---|---|---|---|
| 6,005,866 A * | 12/1999 | Lincoln | 370/398 |
| 6,421,632 B1 * | 7/2002 | LeCorney | 702/185 |
| 6,658,007 B1 * | 12/2003 | Pasternak et al. | 370/395.4 |
| 7,068,660 B2 * | 6/2006 | Suni | 370/395.2 |
| 7,099,943 B1 * | 8/2006 | Tondering | 709/226 |
| 2002/0036984 A1 * | 3/2002 | Chiussi et al. | 370/232 |
| 2002/0163887 A1 * | 11/2002 | Suni | 370/232 |
| 2003/0031131 A1 * | 2/2003 | Bottiglieri et al. | 370/235 |
| 2003/0147399 A1 * | 8/2003 | Burns | 370/395.4 |
| 2004/0066785 A1 * | 4/2004 | He et al. | 370/395.21 |
| 2005/0002453 A1 * | 1/2005 | Chang et al. | 375/240.03 |
| 2006/0126624 A1 * | 6/2006 | Yazaki et al. | 370/389 |
| 2006/0198446 A1 * | 9/2006 | Ribas-Corbera et al. | 375/240.25 |

OTHER PUBLICATIONS

3rd Generation Partnership Project: Technical Specification Group GSM/EDGE Radio Access Network; 3GPP TS 48.018, V5.5.1 (Dec. 2002).

* cited by examiner

*Primary Examiner*—Ajit Patel

(57) ABSTRACT

The method provides variable granularity to control data flow by using a scalar parameter to modify buffer capacity indicator. The scalar parameter allows for adjustment of the data flow control scheme and may be predetermined or dynamically set as desired or required for the particular system.

13 Claims, 1 Drawing Sheet

METHODS PROVIDING VARIABLE GRANULARITY FOR DATA FLOW CONTROL USING A LEAKY BUCKET

BACKGROUND OF THE INVENTION

The term "leaky bucket" or "leaky bucket algorithm" is often used to refer to the generic cell rate algorithm (GCRA), which is a data packet policing policy that may be used to determine conformance to defined transmission levels. The GCRA may be implemented to monitor traffic flow for a user or network connection to ensure compliance with defined transmission levels. Specifically, the GCRA determines whether transmitted data, typically in the form of data packets, conforms to a particular data packet flow specification (e.g., data flow contract). For example, the GCRA may be used in combination with control parameters to enforce the conformance by monitoring and controlling data packet flow. Further, and for example, the GCRA may be used in combination with other network control functions to detect violations of negotiated parameters and to take appropriate actions.

The GCRA is essentially a data packet policing policy wherein a "leaking hole" defines the rate at which data packets can be accommodated, while the bucket depth defines the tolerance to data packet bursting over a given time period. For example, asynchronous transfer mode (ATM) data packets received in a bucket are leaked out of the bucket at a requested (e.g., contracted) rate, such as a leak rate to ensure quality of service (QoS). The bucket is typically a storage device, such as a buffer, cache or allocated memory in a storage device. In operation, one or more buckets are filled, and data is "leaked" to users (e.g., subscribers) at a predetermined rate (i.e., leak rate).

Various methods for controlling data flow using the GCRA are known. These methods may be defined by specific technical standards and/or specifications, including, for example, as set forth in a $3^{rd}$ Generation Partnership Project (3GPP) specification. For example, a 3GPP technical specification for procedures used on a base station system (BSS) serving a general packet radio service (GPRS) support node (SGSN) interface for control of global system for mobile communication (GSM) packet data services within the digital cellular communications system (Phase 2+) using a leaky bucket is set forth in 3GPP TS 48.018. The 3GPP TS 48.018 specification, as well as others, define a leaky bucket data flow control scheme that provides limited flexibility in setting the various parameters for the leaky bucket process. For example, these parameters are often predetermined and do not allow for any modification or adjustment. This limited flexibility can result in inefficient usage of the resource and inability of certain service provisioning in a system.

SUMMARY OF THE INVENTION

Various embodiments of the present invention provide a method with variable granularity to control data flow using a leaky bucket algorithm. Specifically, an adjustable scalar parameter (i.e., granularity parameter) is used to adjust the granularity for data flow control. The adjustable scalar may be used to vary or scale specific parameters used by the leaky bucket algorithm, and particularly with respect to the capacity of a particular leaky bucket. The scalar parameter may be adjusted between a range of values depending upon a required or desired granularity. Further, the scalar parameter may be dynamically adjusted based upon, for example, system and service requirements or operating conditions.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

The following description of the various embodiments of the present invention is merely exemplary in nature and is in no way intended to limit the invention, its application, or uses. Although the various embodiments of the present invention are described for use in connection with a data flow scheme using specific parameters and having particular requirements, it is not so limited, and the various embodiments may be implemented in connection with data flow schemes using different parameters and having different requirements.

An exemplary system in connection with which various embodiments of the present invention may be implemented will first be described. Thereafter, an exemplary data flow control procedure in connection with which various embodiments of the present invention may be implemented will be described. The various embodiments of the present invention will then be described.

Figure 1:
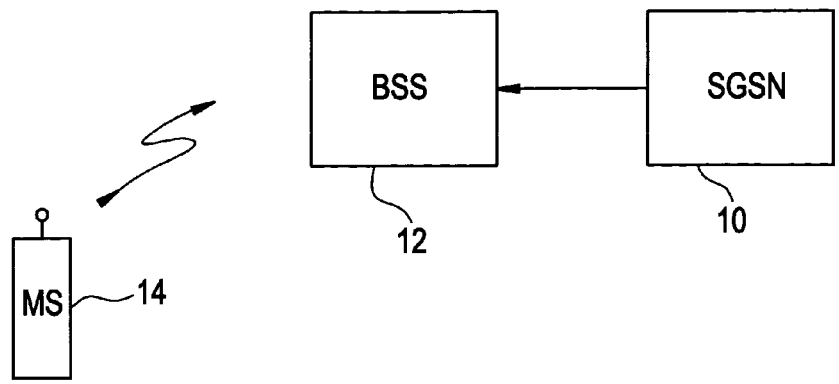
FIG. 1 illustrates a block diagram of a portion of a 3GPP GSM communications system.

FIG. 1 illustrates a portion of a 3rd Generation Partnership Project (3GPP) Global System for Mobiles (GSM) communication system. As shown, a general packet radio service (GPRS) support node (SGSN) 10 connects over an interface with a base station system (BSS) 12. The BSS 12 wirelessly communicates with one or more mobile stations (MSs) 14. Among its several well-known functions, the SGSN 10 receives data packets destined for one of the MSs 14 served by the BSS 12, buffers the data packets and sends the data packets to the BSS 12. The BSS 12 then communicates these data packets to the MS 14. The SGSN 10 has a much larger capacity to receive and buffer data packets than that of the BSS 12. Typically, one SGSN 10 will serve several BSSs 12. As a result, the SGSN 10 must control the flow of data packets to the BSS 12 to prevent overflowing the buffers of the BSS 12.

To accomplish this, the BSS 12 sends flow control parameters to the SGSN 10 indicating the state of the buffers in the BSS 12, and the SGSN 10 performs flow control according to the leaky bucket algorithm using the received flow control parameters. Specifically, for each buffer (also referred to interchangeably as a bucket in this disclosure), the BSS 12 provides the SGSN 10 with the following flow control parameters:

(1) the bucket or buffer size (Bmax) for a given buffer;
(2) the bucket leak rate (R) for a given buffer, which defines the rate at which data packets are leaked from the buffer; and
(3) the bucket full ratio for a given buffer, which indicates how close the buffer is to full. Conventionally, the bucket full ratio is defined as the number of packets currently filling the bucket (Bcurrent) divided by the size of the bucket Bmax times 100.

Figure 2:
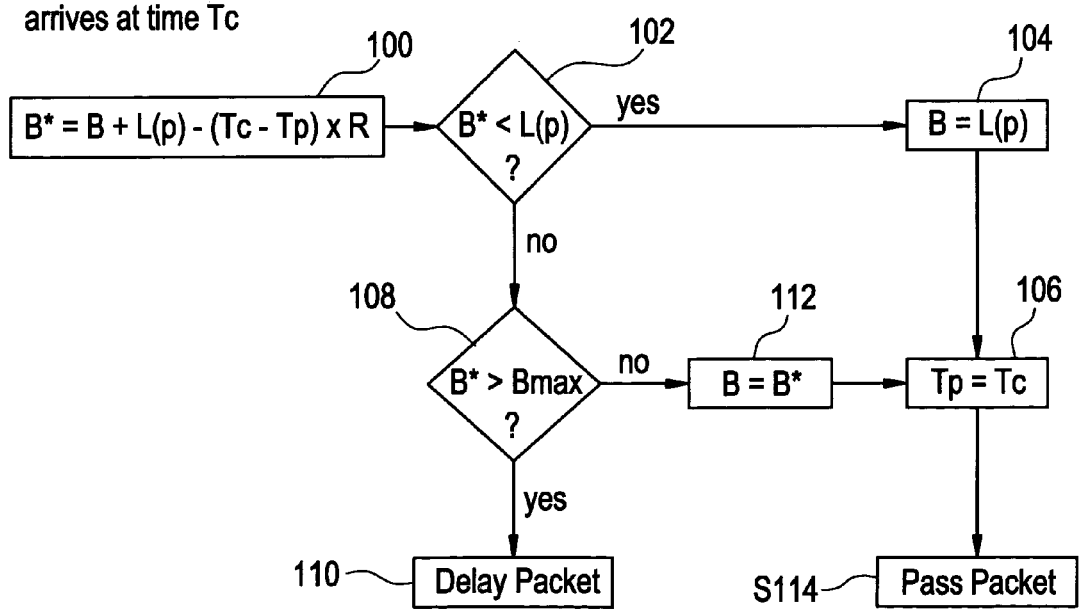
FIG. 2 illustrates a flow chart of the leaky bucket algorithm employed by the communications system of FIG. 1.

Using these flow control parameters, the SGSN 10 controls the flow of data packets to the buffer in the BSS 12 associated with the flow control parameters. FIG. 2 illustrates a flow chart of this flow control procedure. While this flow control procedure will be described with respect to a single bucket in a single BSS 12, it will be appreciated that the SGSN 10 may perform this procedure for each buffer (or bucket) in the BSS 12 and may perform this procedure for a number of BSSs 12.

In general, the SGSN 10 maintains a bucket count (B) indicating the number of packets currently in an associated bucket of the BSS 12, and sends a data packet if the bucket count B plus the length of the data packet does not exceed the bucket size Bmax. When the data packet is passed, the data packet length is added to B. Any data packet not transmitted is delayed until B plus the data packet length is less than Bmax.

Specifically, the data flow control algorithm is used to determine which data packets (e.g., control data packets) are conforming to a required or requested flow rate.

The parameters used by the algorithm are defined as follows:

Bmax Bucket Size, which may be set by the base station for each cell and each mobile station;
R leak rate of the bucket;
B bucket count;
B* predicted value of the bucket count;
L(p) length of data packet;
Tp the time that the last data packet was transferred from the SGSN 10; and
Tc arrival time of data packet at SGSN 10.

In particular, when a data packet p arrives at current time Tc at the SGSN 10, the predicted bucket count B* is determined by the SGSN 10 as the previous bucket count B plus the size L(p) of the new data packet, B*=B+L(p), less the amount that the bucket will have leaked away since the last data packet was sent, R×(Tc−Tp). Thus, at step 100, the SGSN 10 sets B* equal to B+L(p)−R×(Tc−Tp). At step 102, the SGSN 10 determines whether B* is less than L(p). If B* is less than L(p), then the data packet p is compliant; meaning the data packet p can be sent to the BSS 12. As such, the bucket size B is reset to L(p) (i.e., B=L(p)) at step 104, the last data packet transfer time Tp is set equal to the data packet arrival time Tc in step 106, and the data packet is passed to the BSS 12 in step S114.

If B* is not less than L(p) at step 102, indicating that the bucket has not completely leaked away, then the bucket has to be checked to determine if sending the data packet will overflow the buffer. Specifically, at step 108, the SGSN 10 determines whether B*>Bmax. If B* is greater than Bmax, then the data packet is not compliant, is delayed at step 110 for a predetermined time period and the variables described above are not updated. If the bucket limit Bmax has not been exceeded at step 108, such that B*<Bmax, then the data packet is compliant. As such, the bucket count B is set equal to the predicted bucket count B* at step 112, the last data packet transfer time Tp is set equal to the data packet arrival time Tc in step 106, and the data packet is passed to the BSS 12 in step S114.

It should be noted that the BSS 12 may update the values of Bmax and R at any time.

As will be appreciated, because the bucket count B at the SGSN 10 is updated based on a prediction of how full the bucket is, the bucket count may, over time, fail to accurately represent the filled state of the bucket. Accordingly, the BSS 12 sends the bucket full ratio (BFR) to the SGSN 10, and the SGSN 10 synchronizes the bucket count B with the filled state of the bucket. Namely, the SGSN 10 sets the bucket count B equal to BFR*Bmax/100.

In sending the bucket full ratio to the SGSN 10, the BSS 12 encodes the bucket full ratio as an eight bit value ranging between zero (00000000) and two-hundred and fifty-five (11111111). A value of zero means the bucket is empty, a value of one-hundred means the bucket is full, and a value of two-hundred and fifty-five would mean the bucket is 2.55 times full. As will be appreciated, the bucket full ratio typically varies between zero and one-hundred; thus, leaving a significant amount of the encoding capacity unused.

Various embodiments of the present invention provide a leaky bucket data flow control algorithm having variable granularity for data flow control. The various embodiments allow for adjusting or scaling the granularity of the bucket full ratio for a bucket, independent of the encoding format of the variable full ratio. The various embodiments also provide for dynamically adjusting the bucket full ratio based upon, for example, system requirements or transmission needs at a particular time. Variable flow control or granularity may be provided, for example, for controlling data flow from the SGSN 10 to the BSS 12.

In one exemplary embodiment, a scalar parameter, and more particularly, a granularity scalar parameter for modifying the bucket full ratio for a leaky bucket is defined as follows:

0<Granularity Scalar (Gscal)≦Granularity Scalar Max (Gmax), with the bucket full ratio (BFR) defined as follows:

BFR=Bcurrent*(Gscal/Bmax), where Bcurrent is the current amount of stored information (e.g., data packets) in the bucket and Bmax is the maximum bucket size (e.g., maximum amount of data packets that can be stored).

It should be noted that information relating to the bucket full ratio, which is used to control data flow, may be represented by a predetermined number of data bits, such as eight bits (i.e., octet). This information may be transmitted between, for example, a BSS 12 and a SGSN 10 for use in controlling data flow.

The granularity scalar modifies the bucket full ratio value such that the granularity of information relating the level of the leaky bucket may be modified. For example, a Gscal value of 255 may be used such that the entire encoding capacity of the eight bit BFR value is utilized. In this example, a BFR value of 255 represents a full bucket. Essentially, the granularity scalar effectively changes the amount of information that may be transmitted in the BFR. It will be appreciated, however, that the Gscal value may be adjusted based upon the particular requirements for a system and/or as otherwise desired or needed.

For example, the granularity scalar may be predetermined or dynamically set based upon system requirements (e.g., characteristics of data packet streams of different users or based upon QoS requirements). Further, and in one exemplary embodiment, the granularity scalar is dynamically adjusted based upon system conditions (e.g., receiver usage or operating conditions). Thus, the granularity for a particular leaky bucket may be determined as follows:

Granularity=Gscal/Bmax.

At the SGSN 10, the current fill state B of the bucket is determined as B=BFR*(Bmax/Gscal). As will be appreciated, when the Gscal value is a predetermined value, this value may be preset in both the BSS 12 and the SGSN 10, or may be communicated by one of the BSS 12 and the SGSN 10 to the other of the BSS 12 and the SGSN 10. It will further be appreciated that when the Gscal value is dynamically determined, the one of the BSS 12 and the SGSN 10 determining or first receiving the Gscal value communicates the Gscal value to the other of the SGSN 10 and the BSS 12.

Thus, embodiments of the present invention provide a variable granularity scalar for use with a leaky bucket data flow scheme that results in flexibility and improved data transmission (e.g., optimized data flow within a receiver). This flexibility results in more efficient usage of communication systems (e.g., an ATM communication system), as well as providing increased capacity for those systems. For example, based upon the requirements or operating characteristics of a receiver, the Gscal may be modified to optimize data flow. This may include adjusting the Gscal such that use of other components of a receiver (e.g., buffers and processors) is optimized. Further, and for example, by using appropriate Gscal, the prediction accuracy of the bucket fill level can be improved to the system limit, resulting in less events of bucket overflow and thereafter less signaling traffic necessary to reset the bucket and to resynchronize the transmission, in addition to a reduced system outage time for the user traffic.

Thus, adjustable granularity for a leaky bucket provided by various embodiments of the present invention increases the effective usage (e.g., optimizes usage) of data transmissions, which can increase the capacity of, for example the interface between an SGSN and a BSS as described above. It also allows for service provisioning adaptive to QoS requirements, as the actual value of Gscal is the outcome of a trade-off between the signaling overhead and the service quality requirement. The leaky bucket controls the final aggregated traffic going into to a transmission medium and the various embodiments of the present invention provide scalable granularity that can be adjusted based upon the data packet flow, other system requirements, operating conditions or the configuration of the system (e.g., buffer configuration).

The description of the various embodiments of the invention is merely exemplary in nature and, thus, variations that do not depart from the gist of these embodiments are intended to be within the scope of the invention. For example, while described in connection with data flow control from a SGSN to a BSS, the present invention is not limited to this application. Such variations are not to be regarded as a departure from the spirit and scope of the various embodiments of the invention.

What is claimed is:

1. A method for controlling data flow using a leaky bucket data flow control algorithm, the method comprising:
    adjusting an amount of information transmitted to and from a leaky bucket using a granularity scalar parameter in a leaky bucket data full ratio of the leaky bucket data flow algorithm, the leaky bucket data full ratio indicating a current amount of data in a leaky bucket in relation to a maximum data capacity of the leaky bucket, and the granularity scalar parameter modifying the indication of the leaky bucket data full ratio.

2. The method according to claim 1, further comprising:
    adjusting the granularity scalar parameter based upon a user determined scaling value.

3. The method according to claim 1, wherein the granularity scalar parameter is within a predetermined range.

4. The method according to claim 2, wherein the step of adjusting is performed dynamically.

5. A method for data flow control comprising:
    scaling a control parameter in a leaky bucket data full ratio of a leaky bucket data flow algorithm to adjust an amount of information transmitted to and from a leaky bucket, the leaky bucket data full ratio indicating a current amount of information in the leaky bucket in relation to the maximum level of the leaky bucket, the control parameter modifying the leaky bucket data full ratio indication.

6. The method according to claim 5, wherein the scaling is performed within a predetermined range.

7. The method according to claim 6, wherein the predetermined range is between an empty bucket level and a maximum bucket level.

8. The method according to claim 6, further comprising:
    using a user defined scaling value for scaling the control parameter.

9. The method according to claim 6, further comprising:
    dynamically adjusting a number of data bits in a leaky bucket data full ratio based upon scaling of the control parameter.

10. The method according to claim 6, further comprising:
    varying data flow based upon scaling of the control parameter.

11. A method for controlling data flow using a leaky bucket data flow control algorithm, the method comprising:
    modifying a granularity scalar parameter in a leaky bucket data ratio of the leaky bucket data flow control algorithm to adjust an indication of a leaky bucket current data level relative to a leaky bucket maximum data capacity, the indication provided by the bucket data full ratio, thereby enhancing leaky bucket data flow as controlled by the leaky bucket data flow control algorithm.

12. The method according to claim 11, further comprising:
    establishing the granularity scalar parameter based upon system requirements.

13. The method according to claim 11 further comprising:
    dynamically changing the granularity scalar parameter.

* * * * *